US012770767B2

(12) United States Patent
Zhang et al.

(10) Patent No.: US 12,770,767 B2
(45) Date of Patent: Oct. 20, 2026

(54) FRAMEWORK, FRAMEWORK ASSEMBLY, COIL ASSEMBLY, AND ELECTRONIC EXPANSION VALVE

(71) Applicant: ZHEJIANG DUNAN ARTIFICIAL ENVIRONMENT CO., LTD., Shaoxing (CN)

(72) Inventors: Jiyou Zhang, Shaoxing (CN); Yonghao Chen, Shaoxing (CN); Lifeng Zheng, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 84 days.

(21) Appl. No.: 18/718,784

(22) PCT Filed: Dec. 15, 2022

(86) PCT No.: PCT/CN2022/139373
§ 371 (c)(1),
(2) Date: Jun. 11, 2024

(87) PCT Pub. No.: WO2023/109915
PCT Pub. Date: Jun. 22, 2023

(65) Prior Publication Data

US 2025/0052334 A1 Feb. 13, 2025

(30) Foreign Application Priority Data

Dec. 15, 2021 (CN) ......................... 202111538994.9
Dec. 15, 2021 (CN) ......................... 202123189432.6

(51) Int. Cl.
*H01F 5/04* (2006.01)
*F16K 27/00* (2006.01)

(52) U.S. Cl.
CPC ............... *H01F 5/04* (2013.01); *F16K 27/00* (2013.01)

(58) Field of Classification Search
CPC .... F16K 27/029; H01F 5/04; H01F 2005/043; H01F 2007/062; H01F 27/30; F25B 41/34; H02K 3/525; H02K 5/225
See application file for complete search history.

(56) References Cited

U.S. PATENT DOCUMENTS 3,843,946 A * 10/1974 Anderson .............. H02K 3/525 336/198
5,004,941 A * 4/1991 Ohzeki .................. H02K 5/225 336/198

(Continued)

FOREIGN PATENT DOCUMENTS

CN 2791413 Y 6/2006
CN 201487358 U 5/2010

(Continued)

OTHER PUBLICATIONS

The first office action of counterpart EP application No. 22906660.0 issued on Feb. 12, 2025.

(Continued)

*Primary Examiner* — Reinaldo Sanchez-Medina
(74) *Attorney, Agent, or Firm* — The Sun IP Law

(57) ABSTRACT

Provided are a framework, a framework assembly, a coil assembly and an electronic expansion valve. The framework includes a framework body, a connecting part and a pin socket, wherein a first end of the connecting part is arranged on a peripheral surface of the framework body, the pin socket is arranged at a second end of the connecting part away from the framework body, the framework further includes at least one support part, and the at least one support (Continued)

part is arranged on the connecting part, which can solve the problem of the poor waterproof effect of a coil assembly.

13 Claims, 5 Drawing Sheets

(56) References Cited

U.S. PATENT DOCUMENTS

| | | | | |
|---|---|---|---|---|
| 5,121,017 A * | 6/1992 | Yamamoto | H02K 15/022 | 310/49.12 |
| 5,298,820 A * | 3/1994 | Lee | H01F 5/02 | 310/40 MM |
| 7,990,000 B2 * | 8/2011 | Suzuki | H01F 5/02 | 310/49.01 |
| 8,222,779 B2 * | 7/2012 | Kinpara | H02K 3/525 | 310/49.01 |
| 2020/0347952 A1 * | 11/2020 | Lv | F16K 31/04 | |
| 2022/0181057 A1 * | 6/2022 | Zheng | F25B 41/345 | |

FOREIGN PATENT DOCUMENTS

| | | | |
|---|---|---|---|
| CN | 101916639 A | | 12/2010 |
| CN | 205645425 U | | 10/2016 |
| CN | 208982741 U | * | 6/2019 |
| CN | 213025624 U | | 4/2021 |
| CN | 213070865 U | | 4/2021 |
| CN | 213716692 U | | 7/2021 |
| CN | 113223828 A | | 8/2021 |
| CN | 113357852 A | | 9/2021 |
| CN | 216487649 U | | 5/2022 |
| JP | 2009056141 A | | 3/2009 |
| JP | 2013090429 A | | 5/2013 |
| JP | 2015204433 A | | 11/2015 |
| KR | 20070005160 A | | 1/2007 |
| WO | 9313533 A1 | | 7/1993 |

OTHER PUBLICATIONS

The first office action of counterpart CN application No. 2021115389949 issued on Oct. 23, 2025.

The supplementary search report of counterpart CN application No. 2021115389949 issued on Oct. 20, 2025.

The first office action of counterpart JP application No. 20240529710 issued on Mar. 5, 2025.

The notice of allowance of counterpart JP application No. 20240529710 issued on Sep. 1, 2025.

* cited by examiner

FRAMEWORK, FRAMEWORK ASSEMBLY, COIL ASSEMBLY, AND ELECTRONIC EXPANSION VALVE

The present disclosure claims priority to a patent application with application no. 202111538994.9, entitled "Framework, Framework Assembly, Coil Assembly and Electronic Expansion Valve", and filed to the China National Intellectual Property Administration on 15 Dec. 2021.

The present disclosure claims priority to a patent application with application no. 202123189432.6, entitled "Framework, Framework Assembly, Coil Assembly and Electronic Expansion Valve", and filed to the China National Intellectual Property Administration on 15 Dec. 2021.

TECHNICAL FIELD

The present disclosure relates to a technical field of electronic expansion valves, and in particular, to a framework, a framework assembly, a coil assembly and an electronic expansion valve.

BACKGROUND

At present, a coil assembly of an electronic expansion valve includes two frameworks which are snap-fitted with each other, a claw pole is provided on an inner peripheral wall of the framework, a winding is provided on an outer peripheral surface of the framework, and an encapsulation layer is provided on the peripheries of the frameworks and the winding, so as to ensure the waterproof and insulation performances of the coil assembly. Generally, the framework and the winding are encapsulated by an injection molding, but an injection molding force during the injection molding is relatively large, which can easily lead to local deformation of the framework. When the framework deforms locally, it can cause an uneven distribution of the molding compound, which in turn affects a connection effect between the molding compound and the framework, causing a cap to appear between the hardened molding compound and the encapsulation layer, which effects the waterproof and insulating performance of the coil assembly.

SUMMARY

Some embodiments of the present disclosure provide a framework, a framework assembly, a coil assembly and an electronic expansion valve, so as to solve the problem in the prior art of a poor waterproof effect of the coil assembly.

According to one aspect of the present disclosure, provided is a framework, including a framework body, a connecting part and a pin socket, wherein a first end of the connecting part is arranged on a peripheral surface of the framework body, the pin socket is arranged at a second end of the connecting part away from the framework body, the framework further includes at least one support part, and the at least one support part is arranged on the connecting part.

With the application of the technical solution of the present disclosure, the support part is provided, which can play a support role on the connecting part of the framework, reduce a deformation condition of the connecting part of the framework during encapsulation, ensure the uniformity of distribution of an encapsulation layer between two connecting parts, reduce or avoid a gap occurring between the encapsulation layer and the connecting part, and improve the waterproof and insulation effects of the encapsulation layer.

Further, the at least one support part is eccentrically provided on the connecting part in a length direction of the connecting part. By this arrangement, the support effect of the connecting part can be improved.

Further, there are a plurality of support parts, and the plurality of support parts are provided on the connecting part at intervals. By this arrangement, the support effect of the connecting part is further improved.

Further, each of the at least one support part includes a support column or a support bar, and the support bar extends in a length direction of the connecting part. By this arrangement, the whole end face of the support bar away from the connecting part forms a support surface, thereby increasing a support area and further increasing the support effect on the connecting part.

Further, each of the at least one support part includes a support column, and a cross section of the support column is a circle or a polygon. By this arrangement, the whole end face of the support column away from the connecting part can be of a planar structure, so that the stability of the fitting between the support column and other assemblies can be improved, and the support effect of the support column can be ensured.

Further, the pin socket includes a connecting segment and a plug-in segment which are connected to each other, the connecting segment is connected with the connecting part, an angle is formed between an extending direction of the connecting segment and an extending direction of the plug-in segment, and a reinforcing part is provided between the connecting segment and the plug-in segment. The arrangement of the strengthening part can reduce the phenomenon of tearing occurring between the connecting segment and the plug-in segment, improve a connection strength between the connecting segment and the plug-in segment, and prolong a service life of the pin socket.

According to another aspect of the present disclosure, provided is a framework assembly, wherein the framework assembly includes two frameworks snap-fitted with each other, each of the two frameworks includes a framework body, a connecting part, and a pin socket, in the each of the two frameworks, a first end of the connecting part is arranged on a peripheral surface of the framework body, the pin socket is arranged at a second end of the connecting part away from the framework body, the framework bodies of the two frameworks are arranged opposite to each other, the connecting parts of the two frameworks are arranged opposite to each other, and the pin sockets of the two frameworks are arranged in a staggered manner, the framework assembly further includes a support part, at least one connecting part of the two frameworks is provided with the support part, and the support part is used for supporting the connecting parts of the two frameworks.

With the application of the technical solution of the present disclosure, when two frameworks are snap-fitted with each other, the support part is located between two connecting parts, and can support the connecting parts of the two frameworks, thereby reducing the deformation of the two connecting parts during injection molding, ensuring that a molding compound is evenly filled between the two connecting parts, improving the connection effect between the molding compound and the connecting parts, reducing the possibility of a gap occurring between the molding compound and the hardened connecting part, and improving the waterproof and insulation effects of the coil assembly.

Further, the connecting parts of the two framework bodies are both provided with the support parts. By this arrangement, the support effect of the support part on the connecting part can be further improved.

Further, the support part on one connecting part and the support part on the other connecting part are arranged in a staggered manner. By this arrangement, the plurality of support parts are distributed along the extending direction of the connecting part, thereby ensuring that a plurality of positions of the connecting part are supported, and ensuring the support effect of the connecting part.

Further, the support part on one connecting part is arranged opposite to the support part on the other connecting part. By this arrangement, the structures of the two frameworks are completely the same, and when the frameworks are processed, an additional forming moulds and forming procedures are not required, improving the production efficiency.

Further, one connecting part of the two framework bodies is provided with the support part. By this arrangement, an end face of the support part completely abuts against the whole end face of the other connecting part, thereby ensuring the support effect of the support part.

Further, the support part includes a support column or a support bar, and the support bar extends in a length direction of the connecting part. The provision of the support bar can increase a contact area of the connecting part, and further improve the support effect of the connecting part.

According to another aspect of the present disclosure, provided is a coil assembly including the framework assembly as described above.

According to another aspect of the present disclosure, provided is an electronic expansion including the coil assembly as described above.

BRIEF DESCRIPTION OF THE DRAWINGS

The drawings of the description, constituting a part of the present disclosure, are used for providing further understanding of the present disclosure, and the illustrative embodiments of the present disclosure and illustrations thereof are used to explain the present disclosure, rather than constitute inappropriate limitation on the present disclosure. In the drawings.

Figure 1:
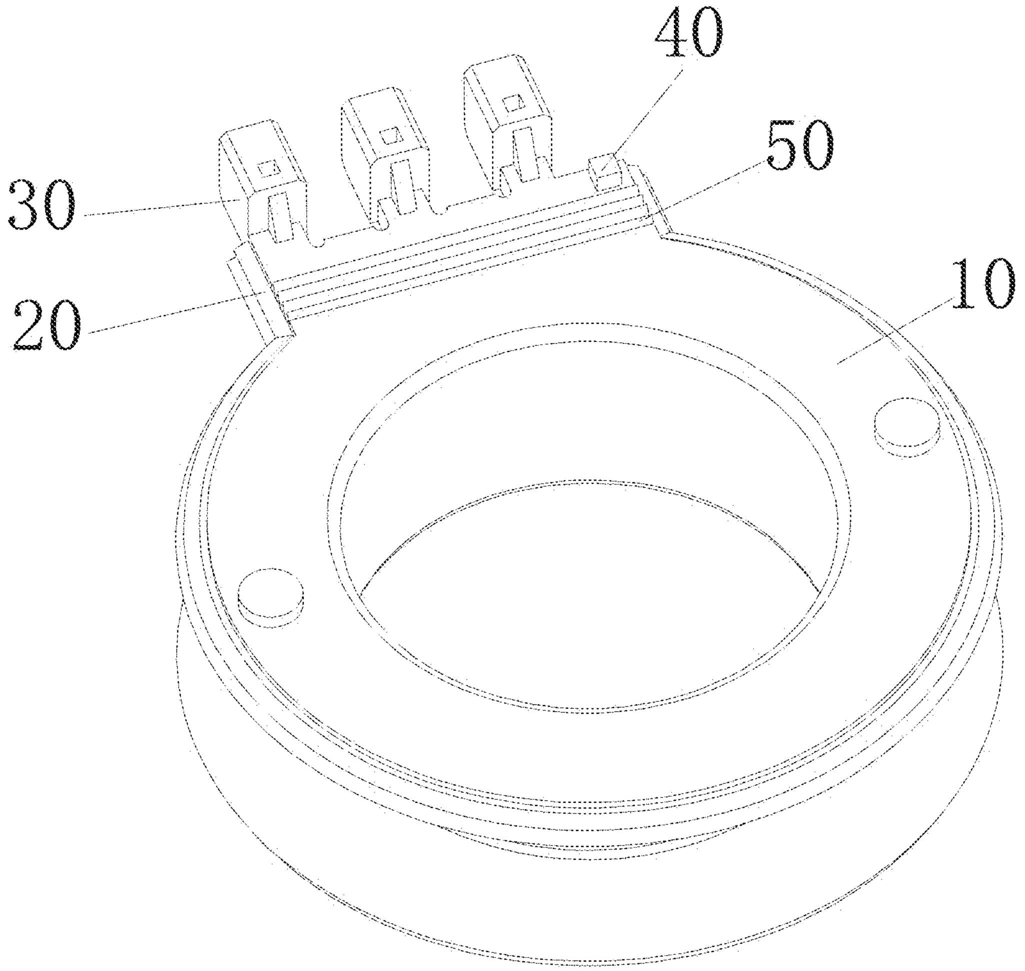
FIG. 1 is a schematic structural diagram of a framework provided according to a first embodiment of the present disclosure.
Figure 2:
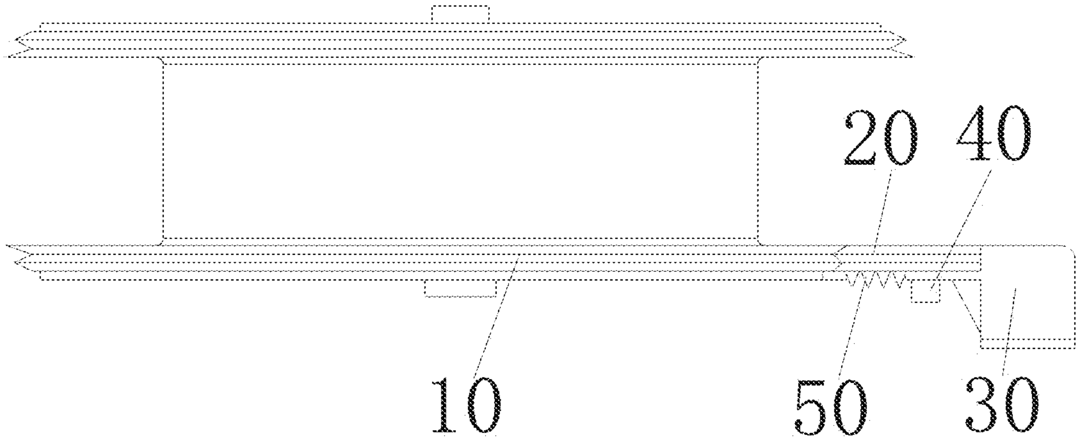
FIG. 2 is a front view of a framework provided according to a first embodiment of the present disclosure.
Figure 3:
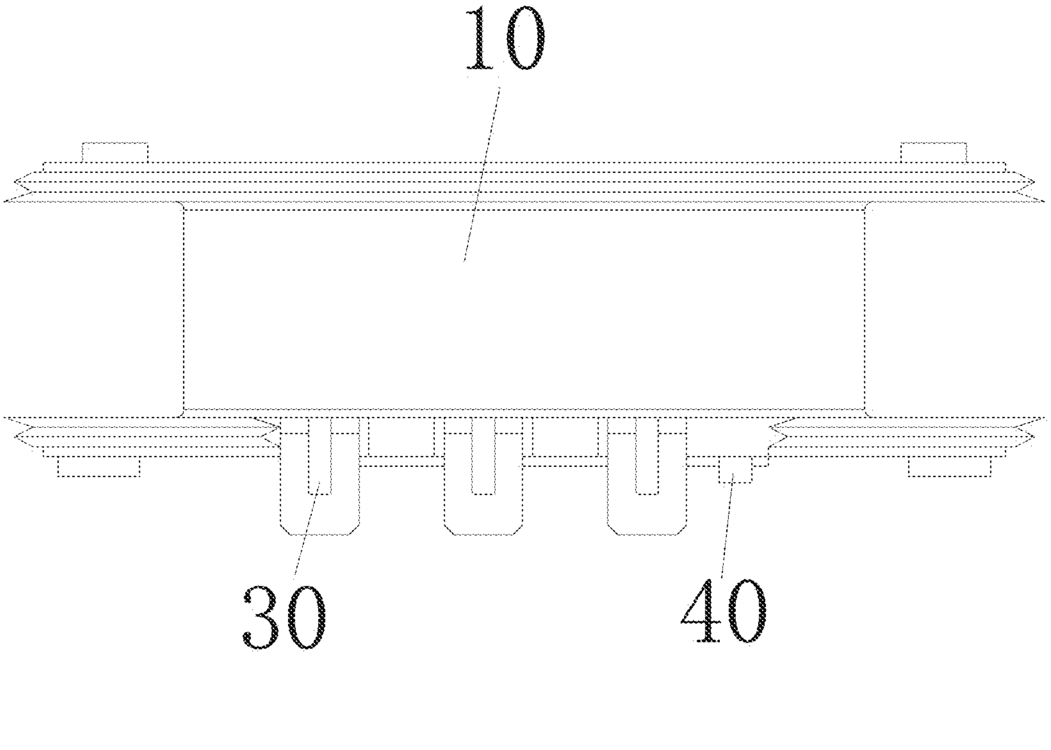
FIG. 3 is a side view of a framework provided according to the first embodiment of the present disclosure.
Figure 4:
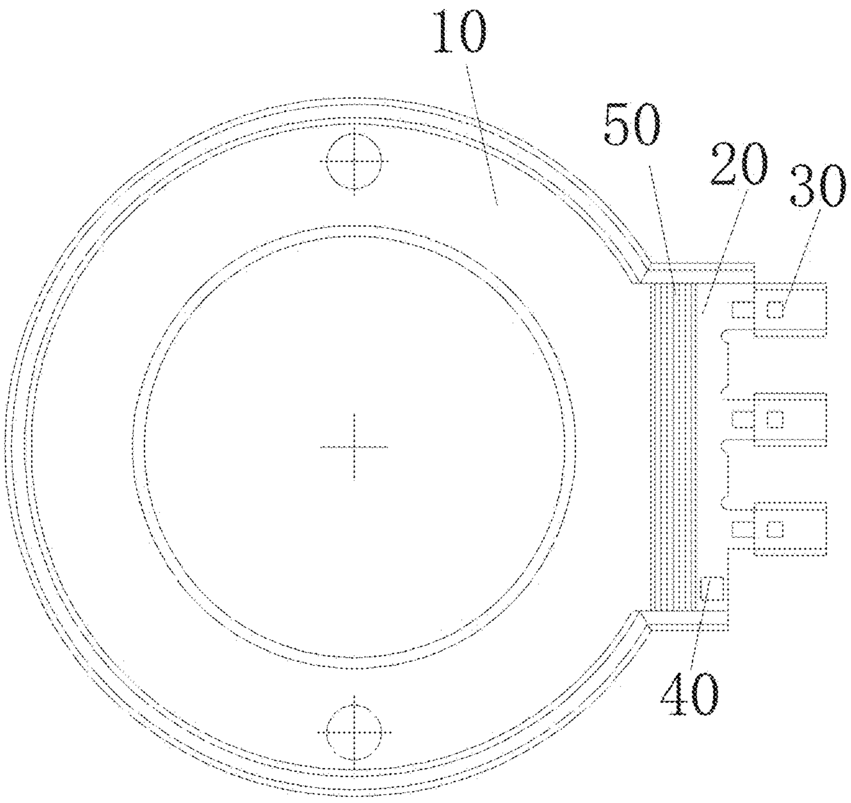
FIG. 4 is a top view of a framework provided according to a first embodiment of the present disclosure.
Figure 5:
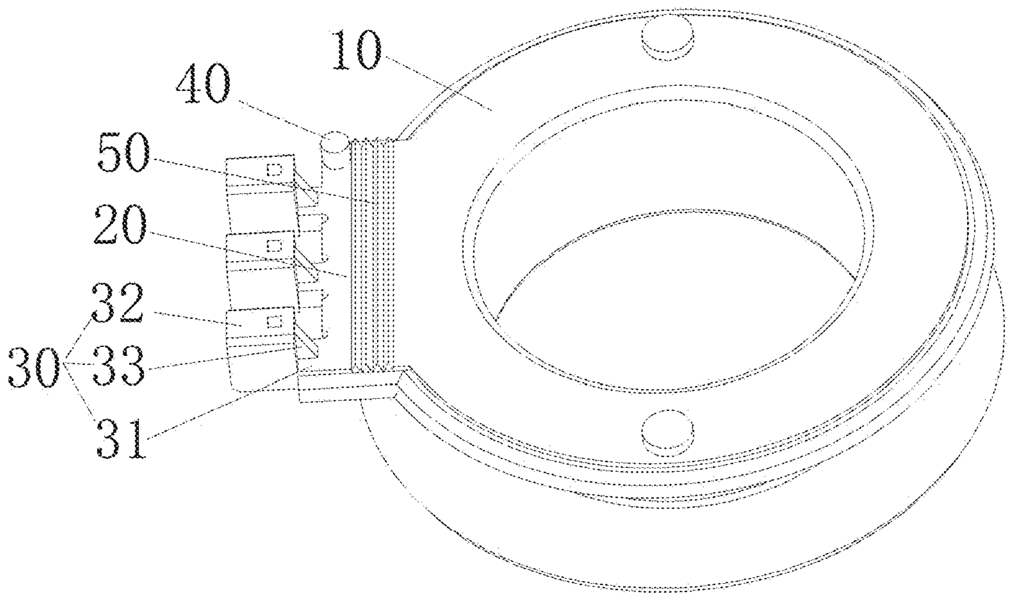
FIG. 5 is a schematic structural diagram of another framework according to the first embodiment of the present disclosure.

The described accompanying drawings include the following reference signs:

10: framework;

20: connecting part;

30: pin socket; 31: connecting segment; 32: plug-in segment; 33: reinforcing part;

40: support part;

50. sealing rib.

DETAILED DESCRIPTION OF THE EMBODIMENTS

Hereinafter, the technical solutions in the embodiments of the present disclosure will be described clearly and thoroughly with reference to the accompanying drawings of the embodiments of the present application. Obviously, the embodiments as described are only some of the embodiments of the present application, and are not all of the embodiments of the present application. The following description of at least one exemplary embodiment is merely illustrative in nature and is in no way intended to limit some embodiments of the present application and any applications or uses thereof. All other embodiments obtained by a person of ordinary skill in the art on the basis of the embodiments of the present disclosure without any inventive effort shall all fall within the scope of protection of some embodiments of the present disclosure.

As shown in FIGS. 1-5, the first embodiment of the present disclosure provides a framework, including a framework body 10, a connecting part 20 and a pin socket 30, wherein a first end of the connecting part 20 is arranged on a peripheral surface of the framework body 10, the pin socket 30 is arranged at a second end of the connecting part 20 away from the framework body 10, the framework further includes a support part 40, and the support part 40 is arranged on the connecting part 20.

With the application of the technical solution of the present disclosure, the support part 40 is provided, which can play a support role on the connecting part 20 of the framework, reduce the condition of deformation of the connecting part 20 of the framework during encapsulation, ensure the uniformity of distribution of an encapsulation layer between two connecting parts 20, reduce or avoid a gap occurring between the encapsulation layer and the connecting part 20, and improve the waterproof and insulation effects of the encapsulation layer. In addition, during encapsulation, the encapsulation layer can also wrap around a periphery of the support part 40, thereby further improving the security of the connection between the encapsulation layer and the framework.

In some embodiments, the framework body 10 has a first end and a second end arranged opposite to each other in an axial direction, the connecting part 20 is provided at the first end of the framework body 10, and the support part 40 is provided at the end of the connecting part 20 away from the second end. Furthermore, one or more support parts 40 may be provided, and in the present solution, the number of the support parts 40 is not limited.

In some embodiments, the connecting part 20 and the framework body 10 are of an integrated structure, and when there are a plurality of support parts 40, the plurality of support parts 40 can be arranged at intervals in an extending direction of the connecting part 20. When there is only one support part 40, the support part 40 may be provided at a center in the length direction of the connecting part 20, or may be eccentrically provided on the connecting part 20 in the length direction of the connecting part 20. In the present embodiment, one support part 40 is provided, and is provided at an end portion of the connecting part 20, and the support part 40 and the connecting part 20 are of an integrated structure. By means of this arrangement, the support effect of the support part 40 on the end portion of the connecting part 20 can be enhanced, and the connection strength between the support part 40 and the connecting part 20 can be ensured, thereby further improving the support effect of the support part 40.

In some embodiments, an end surface of the end of the support part 40 away from the connecting part 20 is a flat surface. In this embodiment, the support part 40 is a support column, and a cross section of the support part 40 is a circle or a polygon. The present solution does not specifically limit the shape of the cross section of the support column. By means of this arrangement, the support part 40 is conveniently processed and shaped, and the support stability of the support part 40 is guaranteed.

In some embodiments, a plurality of pin sockets 30 are arranged at intervals in an extending direction of the connecting part 20. In the present embodiment, three pin sockets 30 are arranged at intervals in the extending direction of the connecting part 20. Furthermore, the framework further includes a sealing rib 50, the sealing rib 50 is provided on the connecting part 20, the sealing rib 50 and the connecting part 20 are of an integrated structure, the extending direction of the sealing rib 50 is the same as the extending direction of the connecting part 20, a plurality of sealing ribs 50 can be provided in parallel, and the sealing rib 50 and the support part 40 are distributed in a direction from the framework body 10 to the pin socket 30. In some embodiments, there are four sealing ribs 50 provided in parallel. The whole end surface of the end of the connecting part 20 away from the pin socket 30 is connected with the framework body 10, and therefore the deformation degree of the end of the connecting part 20 connected with the framework body 10 is small. By the above arrangement, a support point of the support part 40 is located at the end of the connecting part 20 away from the framework body 10, which can enhance the support effect on the connecting part 20.

In some embodiments, the pin socket 30 includes a connecting segment 31 and a plug-in segment 32 which are connected to each other, the connecting segment 31 is connected with the connecting part 20, an angle is formed between an extending direction of the connecting segment 31 and an extending direction of the plug-in segment 32, and a reinforcing part 33 is provided between the connecting segment 31 and the plug-in segment 32. In some embodiments, the connecting segment 31 and the connecting part 20 are of an integrated structure, the connecting segment 31 and the plug-in segment 32 are of an integrated structure, and the connecting segment 31 and the plug-in segment 32 are both of an integrated structure with the reinforcing part 33. By this arrangement, the phenomenon of tearing at the joint of the connecting segment 31 and the plug-in segment 32 can be avoided or reduced, the strength of the connection between the connecting segment 31 and the plug-in segment 32 is improved, and a service life of the pin socket 30 is prolonged. In some embodiments, the reinforcing part 33 may be of a cylindrical structure or a block structure, and in the present disclosure, the cross section of the reinforcing part 33 is a triangular structure. The cross section of the reinforcing part 33 is configured as a triangular structure, which can reduce the situation in which two adjacent pin sockets 30 are close to each other or are away from each other during an injection molding process, improve the stability of the pin socket 30 during the injection molding process, and improve an injection molding accuracy.

Figure 6:
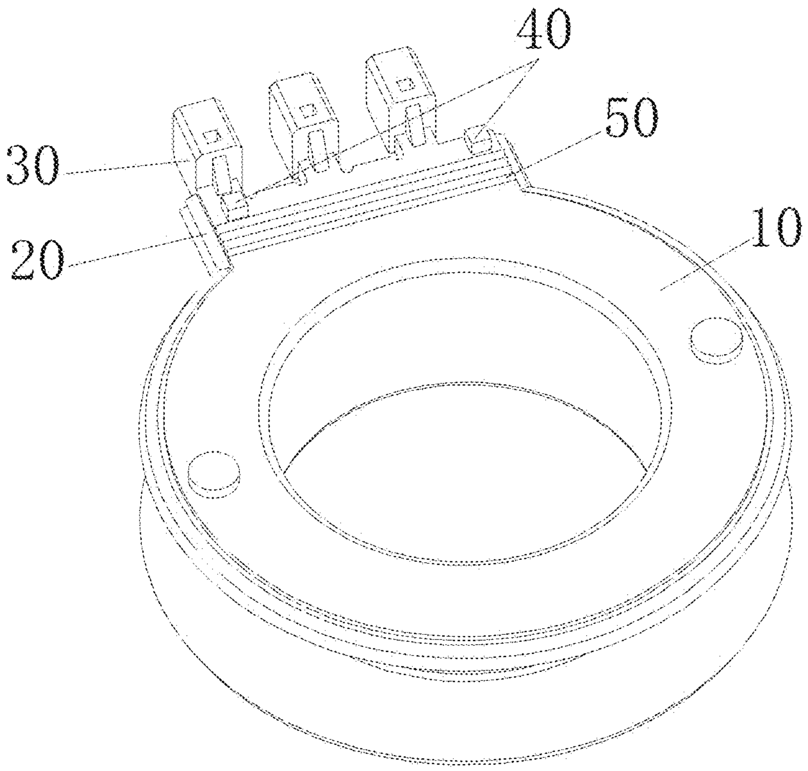
FIG. 6 is a schematic structural diagram of a framework provided according to a second embodiment of the present invention.

As shown in FIG. 6, the second embodiment of the present disclosure provides a framework, and differs from the first embodiment in that a plurality of support columns are provided, and are arranged at intervals in the extending direction of the connecting part 20. The present solution does not limit the number of the support columns. In the present embodiment, two support columns are arranged at intervals in the extending direction of the connecting part 20, and the two support columns are respectively provided at two ends of the connecting part 20.

Figure 7:
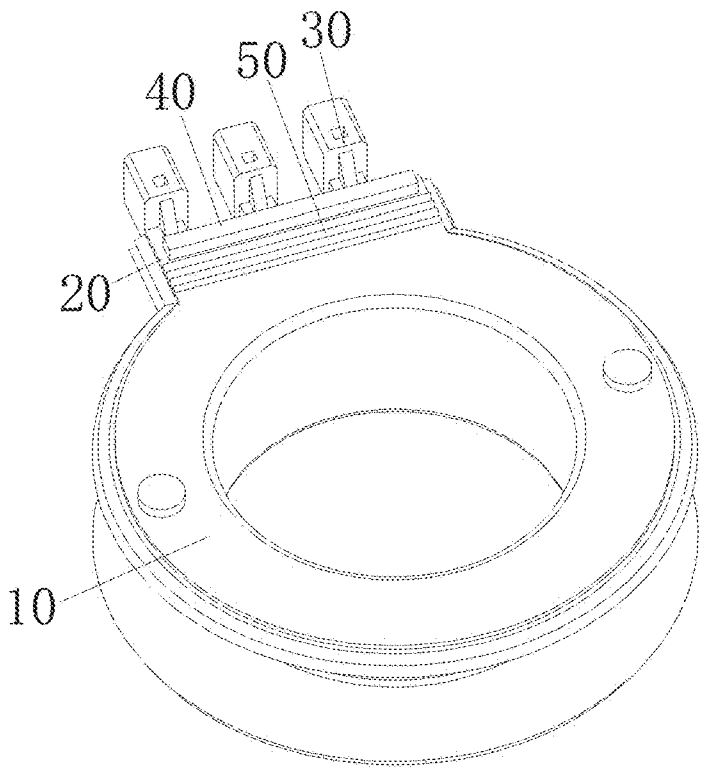
FIG. 7 is a schematic structural diagram of a framework provided according to a third embodiment of the present disclosure.

As shown in FIG. 7, the third embodiment of the present disclosure provides a framework, and differs from the first embodiment in that the support part 40 is a support bar, the support bar extends in the length direction of the connecting part 20, a plurality of support bars are provided in parallel, and in the present embodiment, one support bar is provided. The provision of the support bar can increase a support area of the support part 40, and can support the whole end of the connecting part 20 away from the framework body 10, so as to reduce the phenomenon of deformation of the connecting part 20, and further improve the support effect.

Figure 8:
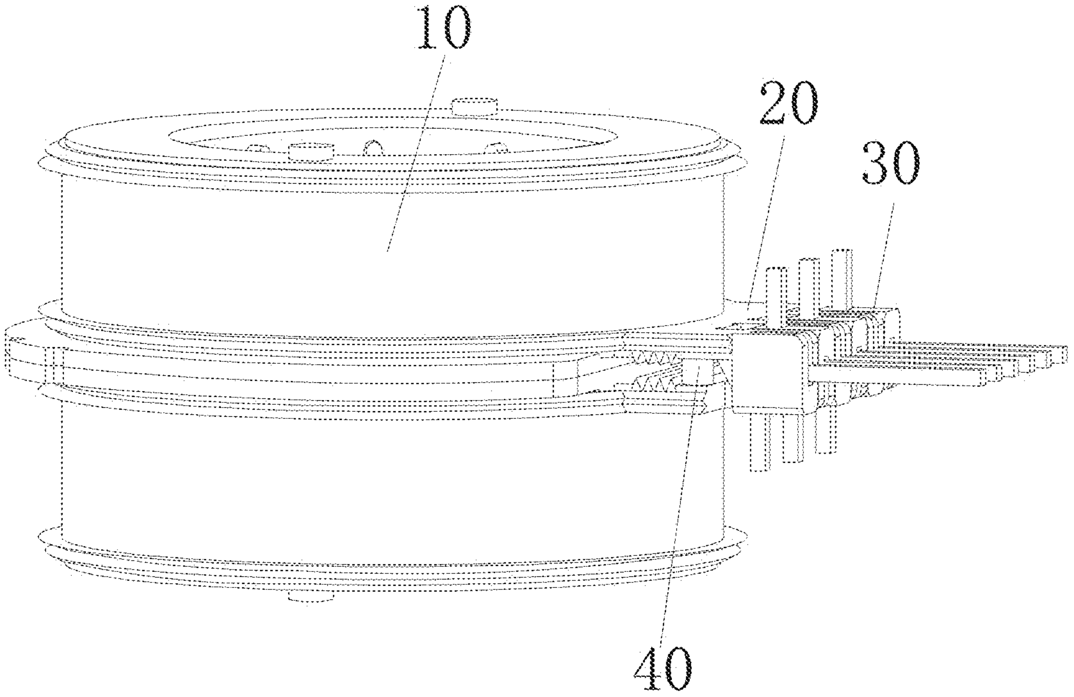
FIG. 8 is a schematic structural diagram of a framework assembly according to a fourth embodiment of the present disclosure.

As shown in FIG. 8, the fourth embodiment of the present disclosure provides a framework assembly, including two frameworks snap-fitted with each other and the support part 40, each of the frameworks includes a framework body 10, a connecting part 20 and a pin socket 30, in the each of the frameworks, one end of the connecting part 20 is arranged on a peripheral surface of the framework body 10, the pin socket 30 is arranged at one end of the connecting part 20 away from the framework body 10, the framework bodies 10 of the two frameworks are arranged opposite to each other, the connecting parts 20 of the two frameworks are arranged opposite to each other, and the pin sockets 30 of the two frameworks are arranged in a staggered manner, at least one connecting part 20 of the two frameworks is provided with the support part 40, and the support part 40 is used for supporting the connecting parts 20 of the two frameworks.

With the application of the technical solution of the present disclosure, when two frameworks are snap-fitted with each other, the support part 40 is located between two connecting parts 20, and can support the connecting parts 20 of the two frameworks, thereby reducing the deformation of the two connecting parts 20 during injection molding, ensuring that the molding compound is evenly filled between the two connecting parts 20, improving the connection effect between the molding compound and the connecting parts 20, reducing the possibility of a gap occurring between the molding compound and a hardened connecting part 20, and improving the waterproof and insulation effects of the coil assembly.

In some embodiments, no support part 40 is provided on the connecting part 20 of one framework in the framework assembly, the framework is a first framework, and the support part 40 is provided on the connecting part 20 of the other framework, and the framework is a second framework. The second framework is the framework in the second embodiment. After the first framework and the second framework are snap-fitted with each other, the two support columns on the second framework both abut against the connecting part 20 on the first framework, and support the two end portions of the first connecting part 20 and the second connecting part 20, respectively, so as to achieve the effect of supporting the first connecting part 20 and the second connecting part 20.

Figure 9:
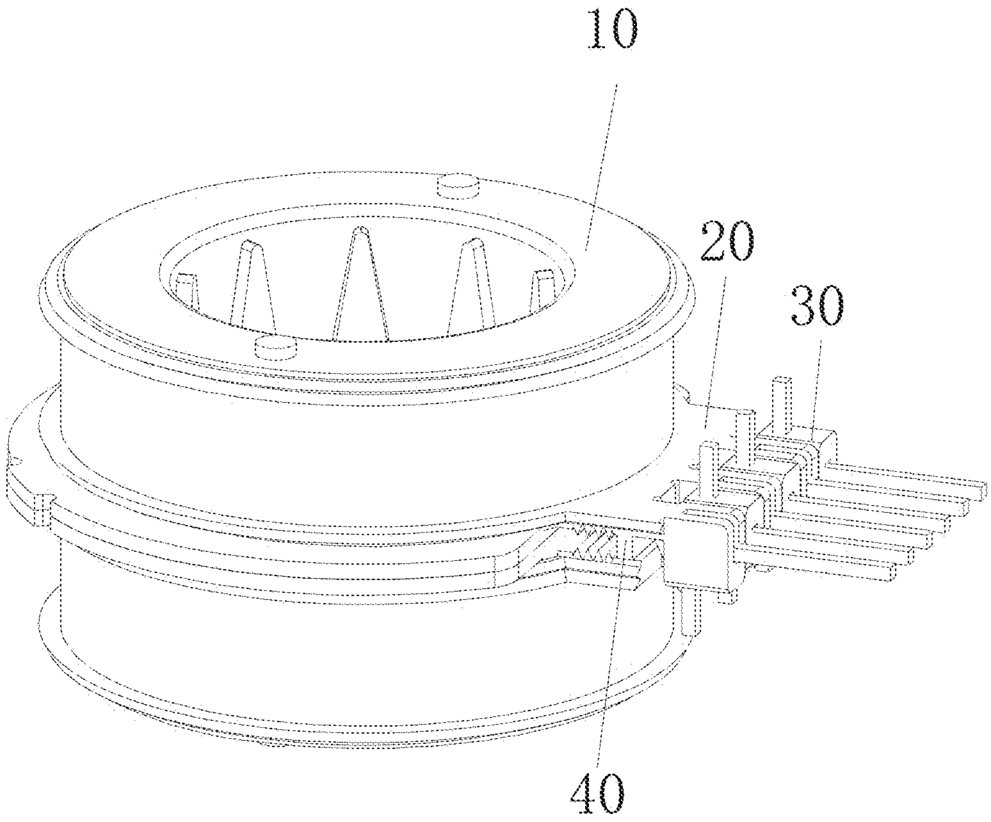
FIG. 9 is a schematic structural diagram of a framework assembly according to a fifth embodiment of the present disclosure.

As shown in FIG. 9, the fifth embodiment of the present disclosure provides a framework assembly, and differs from the fourth embodiment in that the second framework is the framework in the third embodiment. When the first framework and the second framework are snap-fitted with each other, the support bar abuts against the connecting part 20 on the first framework, so as to support the two connecting parts 20. By this arrangement, the support bar supports the connecting parts 20 on the first framework and the end portions of the connecting parts 20 on the second framework, thereby further ensuring the support effect.

In some embodiments, support parts 40 may be provided on both the two frameworks of the framework assembly, and when the support parts 40 are arranged on both the two frameworks of the framework assembly, the support part 40 on one connecting part 20 and the support part 40 on the other connecting part 20 are arranged in a staggered manner. The sixth embodiment of the present disclosure provides a framework assembly, and differs from the fourth embodiment in that a support part 40 is also provided on a connecting part 20 of a first framework, and the first framework and a second framework are both the frameworks in the first embodiment. By means of this arrangement, the structures of the first framework and the second framework are completely the same, and after the two frameworks are snap-fitted with each other, the support part 40 on the first framework abuts against the connecting part 20 on the second framework, and the support part 40 on the second framework abuts against the connecting part 20 on the first framework, so that the two support parts 40 respectively support two end portions of the two connecting parts 20. Therefore, when processing the framework, the described arrangement does not require additional forming molds and forming procedures, thereby improving a production efficiency and reducing production costs.

The seventh embodiment of the present disclosure provides a framework assembly. Each of two frameworks on the framework assembly is provided with a support part 40. The seventh embodiment differs from the sixth embodiment in that the two frameworks are both the frameworks in the second embodiment. After the two frameworks are snap-fitted with each other, the support parts 40 on the two connecting parts 20 abut against each other to support the two connecting parts 20. By the described arrangement, the structures of the two frameworks are completely the same, and when the frameworks are processed, an additional forming moulds and forming procedures are not required, improving the production efficiency.

The eighth embodiment of the present disclosure provides a framework assembly. A support part 40 is provided on each of two frameworks on the framework assembly. The eighth embodiment differs from the sixth embodiment in that the two frameworks are both the frameworks in the third embodiment. After the two frameworks are snap-fitted with each other, the support bars on the two connecting parts 20 abut against each other to support the two connecting parts 20.

The ninth embodiment of the present disclosure provides a coil assembly, which includes the framework assembly in the sixth embodiment.

The tenth embodiment of the present disclosure provides an electronic expansion valve, including the coil assembly in the ninth embodiment.

It should be noted that the terms used herein are for the purpose of describing particular embodiments only and are not intended to limit exemplary embodiments in accordance with the present disclosure. As used herein, the singular form is intended to comprise the plural form as well, unless the context clearly indicates otherwise, and further it should be understood that the terms “comprises” and/or “comprising” when used in the present description, specify the presence of features, steps, operations, devices, components and/or combinations thereof.

Unless specifically stated otherwise, the relative arrangement of components and steps, numerical expressions and numerical values set forth in these embodiments do not limit the scope of the present disclosure. Moreover, it should be understood that for the convenience of description, the dimensions of the parts shown in the drawings are not drawn according to the actual proportional relationship. Techniques, methods and devices known to a person of ordinary skill in the relevant art may not be discussed in detail, but the techniques, methods and devices shall be considered as a part of the description to be granted, where appropriate. In all examples shown and discussed herein, any specific values shall be construed as exemplary only and not as limiting. Therefore, other examples of the exemplary embodiments may have different values. It should be noted that similar numerals and letters represent similar items in the following figures, and thus once an item is defined in a figure, it need not be further discussed in subsequent figures.

In the descriptions of the present disclosure, it should be understood that, the orientations or positional relationships indicated by the orientation terms “front”, “rear”, “upper”, “lower”, “left”, “right”, “transverse, vertical, perpendicular, horizontal”, and “top, bottom”, and the like are merely intended for ease and brevity of the description of this disclosure rather than indicating or implying that the apparatuses or components mentioned must have specific orientations, or must be constructed or manipulated according to specific orientations, and therefore shall not be construed as any limitations on embodiments of this disclosure. Orientation terms “inside, outside” refer to the inside and outside of the contour of each component itself.

In order to facilitate description, a spatial relative term may be used here, such as “over”, “above”, “on an upper surface” and “on”, to describe a spatial location relation between a device or a feature shown in the drawing and other devices or other features. It is to be understood that the spatial relative term aims at including different orientations of the device during use or operation outside the orientation described in the drawing. For example, if the device in the drawing is inverted, it may be described as that the device “above other devices or other structures” or “over other devices or other structures” shall be positioned “under other devices or other structures” or “below other devices or other structures”. Therefore, an exemplary term “above” may include two orientations: “above” and “under”. The device may be positioned in various other ways as well (rotating 90 degrees or at other orientations), and the spatially relative descriptions used herein are to be construed accordingly.

In addition, it should be noted that, using words such as “first” and “second” to define components is merely for the purpose of distinguishing the components. Unless otherwise stated, the foregoing words do not have special meanings and cannot be construed as any limitations on the protection scope of the present disclosure.

The content above merely relates to some embodiments of the present disclosure and is not intended to limit the present disclosure. For a person skilled in the art, the present disclosure may have various modifications and variations. Any modifications, equivalent replacements, improvements, etc. made within the spirit and principle of the present disclosure shall all belong to the scope of protection of the present disclosure.

What is claimed is:

1. A framework assembly, wherein the framework assembly comprises two frameworks snap-fitted with each other, each of the two frameworks comprises a framework body, a connecting part and a pin socket, in the each of the two frameworks, a first end of the connecting part is arranged on a peripheral surface of the framework body, the pin socket is arranged at a second end of the connecting part away from the framework body, the framework bodies of the two frameworks are arranged opposite to each other, the connecting parts of the two frameworks are arranged opposite to each other, and the pin sockets of the two frameworks are arranged in a staggered manner, the framework assembly further comprises a support part, at least one connecting part of the two frameworks is provided with the support part, and the support part is used for supporting the connecting parts of the two frameworks; when one connecting part of the two framework bodies is provided with the support part, the support part on the one connecting part of one framework body abuts against the connecting part on an other framework body; when the connecting parts of the two framework bodies are both provided with the support parts, the support part on any one framework body abuts against the connecting part on the other framework body, or the support parts on the two connecting parts of the two framework bodies abut against each other.

2. The framework assembly as claimed in claim 1, wherein when the connecting parts of the two framework bodies are both provided with the support parts, the support part on one connecting part and the support part on the other connecting part are arranged in a staggered manner, so as to make the support part on one framework body abuts against the connecting part on the other framework body.

3. The framework assembly as claimed in claim 1, wherein when the connecting parts of the two framework bodies are both provided with the support parts, the support part on one connecting part is arranged opposite to the support part on the other connecting part, so as to make the support parts on the two connecting parts abut against each other.

4. The framework assembly as claimed in claim 1, wherein the support part comprises a support column or a support bar, and the support bar extends in a length direction of the connecting part.

5. The framework assembly as claimed in claim 1, wherein the at least one support part is eccentrically provided on the connecting part in a length direction of the connecting part.

6. The framework assembly as claimed in claim 1, wherein there are a plurality of support parts, and the plurality of support parts are provided on the connecting part at intervals.

7. The framework assembly as claimed in claim 1, wherein each of the at least one support part comprises a support column or a support bar, and the support bar extends in a length direction of the connecting part.

8. The framework assembly as claimed in claim 1, wherein each of the at least one support part comprises a support column, and a cross section of the support column is a circle or a polygon.

9. The framework assembly as claimed in claim 1, wherein the pin socket comprises a connecting segment and a plug-in segment which are connected to each other, the connecting segment is connected with the connecting part, an angle is formed between an extending direction of the connecting segment and an extending direction of the plug-in segment, and a reinforcing part is provided between the connecting segment and the plug-in segment.

10. A coil assembly, comprising the framework assembly as claimed in claim 1.

11. The coil assembly as claimed in claim 10, wherein when the connecting parts of the two framework bodies are both provided with the support parts, the support part on one connecting part and the support part on the other connecting part are arranged in a staggered manner.

12. The coil assembly as claimed in claim 10, wherein when the connecting parts of the two framework bodies are both provided with the support parts, the support part on one connecting part is arranged opposite to the support part on the other connecting part.

13. The coil assembly as claimed in claim 10, wherein the support part comprises a support column or a support bar, and the support bar extends in a length direction of the connecting part.

* * * * *